Patented Feb. 2, 1932

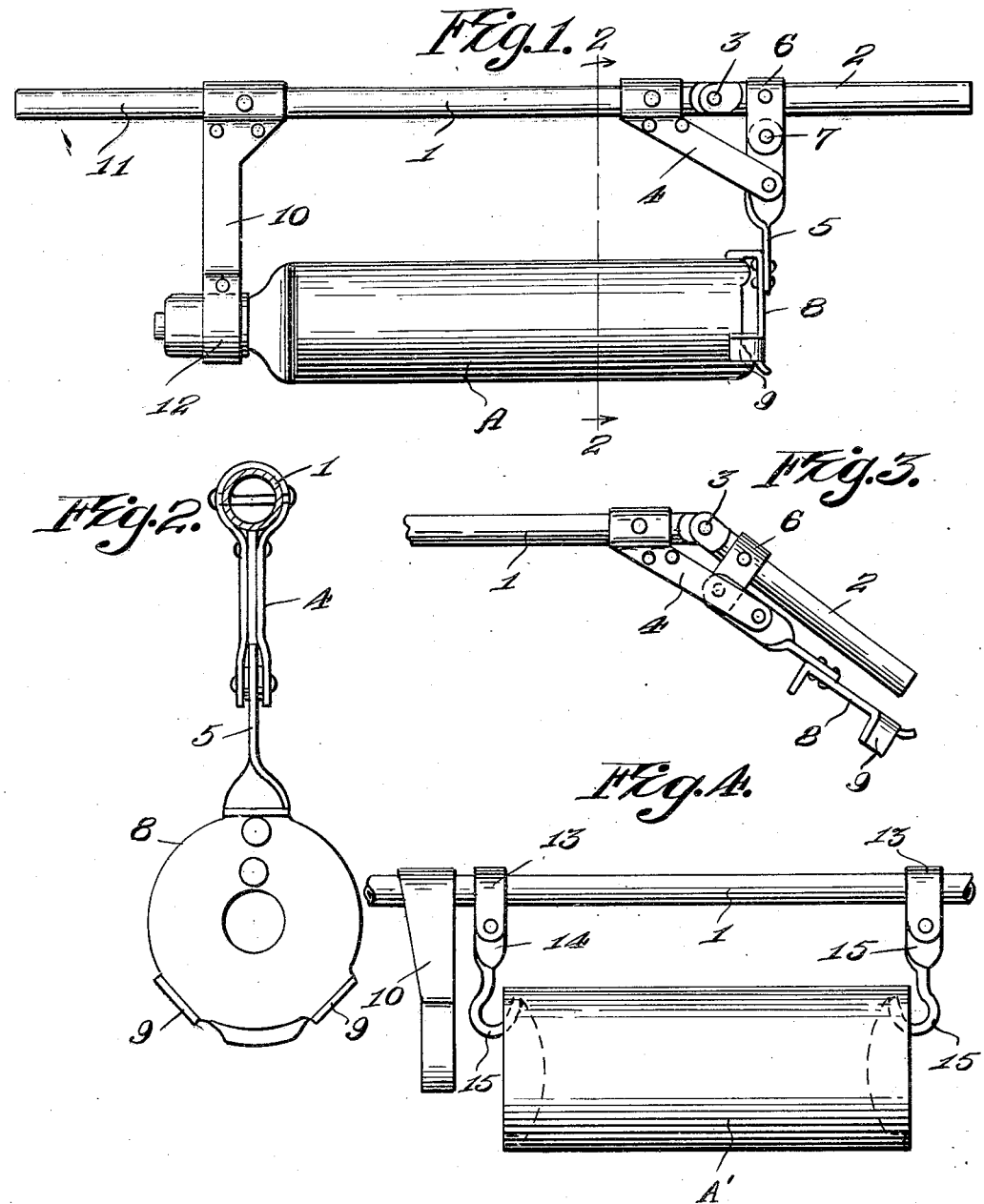

1,843,245

UNITED STATES PATENT OFFICE

CARL SEDERLAND, OF YOUNGSTOWN, OHIO, ASSIGNOR OF ONE-HALF TO RHODY W. HEDLAND, OF YOUNGSTOWN, OHIO

ACETYLENE AND OXYGEN TANK CARRIER

Application filed November 12, 1930. Serial No. 495,265.

This invention relates to a carrier for tanks, such as those containing acetylene and oxygen gas, the general object of the invention being to provide means for transporting the tanks from one place to another, with means for firmly holding the tank to the carrier when the carrier is lifted.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation showing the invention in use.

Figure 2 is a section on line 2—2 of Figure 1.

Figure 3 is a view of one end of the device, showing the handle in lowered position, with one of the tank engaging members in releasing position.

Figure 4 is a view showing the device provided with means for carrying another type of tank.

In these views, the numeral 1 indicates a rod or bar which is formed with a handle section 2 pivoted to the bar, as shown at 3. A bracket 4 has a tubular part encircling the bar in rear of the pivotal point, with the arm of the bracket extending downwardly and forwardly. A lever 5 is pivoted to the outer end of the arm a slight distance from the upper end of the lever and a bracket 6 on the section 2 is pivoted to the upper end of the lever, as shown at 7. These parts are so formed that when the section 2 is lowered, the lever is swung outwardly and upwardly, as shown in Figure 3, and when the section is raised, the lever is swung inwardly into a substantially vertical position, as shown in Figure 1. A plate 8 is fastened to the lower end of the lever and is formed with the right-angularly extending lugs 9 for engaging an end of a tank A, as shown in Figure 1, when the lever is in vertical position.

A member 10 has a tubular part encircling the rod 1 an appreciable distance from the end thereof which is opposite that end to which the section 2 is pivoted, this end of the rod forming a handle 11. The lower end of the member 10 is formed with an eye or loop 12 for receiving the neck of the tank, as shown in Figure 1.

Figure 4 shows a pair of members 13 having eye portions 14 at their upper ends and hooks 15 at their lower ends so that these members can be placed on the rod 1 by removing the member 10, as these members are adapted to be placed on the rod between the other tank supporting members. The hook portions are arranged to engage the undercut ends of the tank A', as shown in Figure 4, so that the invention can be used for carrying either type of tank. These members 13 can be removed when the other members are being used or they can be allowed to remain in place as they are shorter than the other members and will not interfere with the use of such other members.

From the foregoing it will be seen that it is simply necessary to place the neck of a tank to be transported in the eye 12 and then by pulling upwardly on the section 2, the lever 5 is swung inwardly so that the lugs 9 will engage the bottom of the tank, as also shown in said Figure 1. The lever is firmly held with the lugs in engagement with the tank by the strain placed on the handle section 2 as the tank is being carried by two men engaging the handle parts 2 and 11.

When the type of tank shown in Figure 4 is to be carried, the hook portions 15 of the members 13 are placed in engagement with the ends of said tank, as shown in Figure 4.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a bar, a handle section pivoted to one end of the bar, an object engaging member, a bracket depending from the bar adjacent the pivotal point of the handle section and extending outwardly and to which the object engaging member is pivoted a slight distance from its upper end, a bracket on the handle section pivoted to the upper end of the object engaging member whereby when the handle section is swung downwardly, the member will be swung outwardly and when moved upwardly, the member will be swung inwardly into engagement with an object and a second object engaging member fastened to the bar an appreciable distance from its other end for engaging the opposite end of the object.

2. A device of the class described comprising a bar, a handle section pivoted to one end of the bar, a bracket depending from the bar adjacent the pivotal point and extending outwardly, a lever pivoted to the lower end of the bracket, means for pivotally connecting the upper end of the lever with a part of the handle section, a plate on the lower end of the lever having rightangularly extending lugs thereon for engaging an end of a tank, said lever being swung outwardly when the handle section is moved downwardly and said lever being moved inwardly to cause its lugs to engage the tank when the handle section is moved upwardly and a member fastened to the bar an appreciable distance from the other end of the bar, said member having an eye at its lower end for receiving the neck of the tank.

In testimony whereof I affix my signature.

CARL SEDERLAND.